United States Patent
Harada et al.

(10) Patent No.: US 12,160,301 B2
(45) Date of Patent: Dec. 3, 2024

(54) TERMINAL AND RADIO COMMUNICATION METHOD

(71) Applicant: NTT DOCOMO, INC., Tokyo (JP)

(72) Inventors: Hiroki Harada, Tokyo (JP); Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/041,138

(22) PCT Filed: Sep. 30, 2020

(86) PCT No.: PCT/JP2020/037333
§ 371 (c)(1),
(2) Date: Feb. 9, 2023

(87) PCT Pub. No.: WO2022/070365
PCT Pub. Date: Apr. 7, 2022

(65) Prior Publication Data
US 2023/0299839 A1 Sep. 21, 2023

(51) Int. Cl.
*H04B 7/06* (2006.01)
*H04W 8/22* (2009.01)
*H04W 36/06* (2009.01)
*H04W 36/30* (2009.01)

(52) U.S. Cl.
CPC .......... *H04B 7/06964* (2023.05); *H04W 8/22* (2013.01); *H04W 36/06* (2013.01); *H04W 36/304* (2023.05)

(58) Field of Classification Search
CPC ..... H04B 7/06964; H04B 7/024; H04W 8/22; H04W 76/19; H04W 36/305; H04W 36/304; H04W 36/085; H04W 8/24; H04W 16/28; H04W 36/06
See application file for complete search history.

(56) References Cited

U.S. PATENT DOCUMENTS

| 2021/0088978 | A1* | 3/2021 | Kang | G04B 47/04 |
| 2023/0027211 | A1* | 1/2023 | Zhou | H04W 76/15 |
| 2023/0144010 | A1* | 5/2023 | Kwak | H04L 5/0053 370/329 |
| 2024/0063882 | A1* | 2/2024 | Agiwal | H04W 76/19 |

FOREIGN PATENT DOCUMENTS

WO 2020172184 A1 8/2020

OTHER PUBLICATIONS

International Search Report issued in PCT/JP2020/037333 on Apr. 27, 2021 (2 pages).
Written Opinion of the International Searching Authority issued in PCT/JP2020/037333 on Apr. 27, 2021 (4 pages).
(Continued)

*Primary Examiner* — Dac V Ha
(74) *Attorney, Agent, or Firm* — Osha Bergman Watanabe & Burton LLP

(57) ABSTRACT

A terminal receives beams from a plurality of cells that include a non-serving cell and are formed by the same base station. The terminal determines a beam failure or a candidate beam by identifying received signals of the beams from the plurality of cells that include the non-serving cell.

4 Claims, 11 Drawing Sheets

(56) References Cited

OTHER PUBLICATIONS

NTT Docomo, Inc.; "Discussion on inter-cell multi-TRP operations"; 3GPP TSG RAN WG1 #102-e, R1-2006720; e-Meeting; Aug. 17-28, 2020 (4 pages).
Sony; "Considerations on beam management for multi-TRP"; 3GPP TSG RAN WG1 #102e, R1-2005563; e-meeting; Aug. 17-28, 2020 (7 pages).
NTT Docomo, Inc.; "Discussion on beam management for MTRP"; 3GPP TSG RAN WG1 #102-e, R1-2006721; e-Meeting; Aug. 17-28, 2020 (6 pages).
Samsung; "New WID: Further enhancements on MIMO for NR"; 3GPP TSG RAN Meeting #86, RP-193133; Sitges, Spain; Dec. 9-12, 2019 (5 pages).
Office Action issued in Chinese Patent Application No. 202080104276.8, mailed on Jul. 24, 2024 (14 pages).
Office Action issued in Japanese Application No. 2022-553359; Dated Oct. 8, 2024 (8 pages).

* cited by examiner

FIG. 6

```
RadioLinkMonitoringConfig ::=        SEQUENCE {
    failureDetectionResourcesToAddModList    SEQUENCE (SIZE(1..maxNrofFailureDetectionResources)) OF RadioLinkMonitoringRS
                                                                                                 OPTIONAL,    -- Need N
    failureDetectionResourcesToReleaseList   SEQUENCE (SIZE(1..maxNrofFailureDetectionResources)) OF RadioLinkMonitoringRS-Id
                                                                                                 OPTIONAL,    -- Need N
    beamFailureInstanceMaxCount          ENUMERATED {n1, n2, n3, n4, n5, n6, n8, n10}            OPTIONAL,    -- Need R
    beamFailureDetectionTimer            ENUMERATED {pbfd1, pbfd2, pbfd3, pbfd4, pbfd5, pbfd6, pbfd8, pbfd10}  OPTIONAL,  -- Need R
    ...
}

RadioLinkMonitoringRS ::=    SEQUENCE {
    radioLinkMonitoringRS-Id    RadioLinkMonitoringRS-Id,
    purpose                     ENUMERATED {beamFailure, rlf, both},
    detectionResource           CHOICE {
        ssb-Index                   SSB-Index,
        csi-RS-Index                NZP-CSI-RS-ResourceId
    },
    ...
}
```

FIG. 7

```
BeamFailureRecoveryConfig ::=    SEQUENCE {
    rootSequenceIndex-BFR            INTEGER (0..137),
    rach-ConfigBFR                   RACH-ConfigGeneric
    rsrp-ThresholdSSB                RSRP-Range                                                            OPTIONAL,   -- Need M
    candidateBeamRSList              SEQUENCE (SIZE(1..maxNrofCandidateBeams)) OF PRACH-ResourceDedicatedBFR    OPTIONAL,   -- Need M
    ssb-perRACH-Occasion             ENUMERATED {oneEighth, oneFourth, oneHalf, one, two,
                                         four, eight, sixteen}                                            OPTIONAL,   -- Need M
    ra-ssb-OccasionMaskIndex         INTEGER (0..15)                                                      OPTIONAL,   -- Need M
    recoverySearchSpaceId            SearchSpaceId                                                        OPTIONAL,   -- Need R
    ra-Prioritization                RA-Prioritization                                                    OPTIONAL,   -- Need R
    beamFailureRecoveryTimer         ENUMERATED {ms10, ms20, ms40, ms60, ms80, ms100, ms150, ms200}       OPTIONAL,   -- Need M
    ...,
    [[
    msg1-SubcarrierSpacing           SubcarrierSpacing                                                    OPTIONAL    -- Need M
    ]],
    [[
    ra-PrioritizationTwoStep-r16     RA-Prioritization                                                    OPTIONAL,   -- Need R
    candidateBeamRSListExt-v1610     SetupRelease{ CandidateBeamRSListExt-r16 }                           OPTIONAL    -- Need M
    ]]
}

PRACH-ResourceDedicatedBFR ::=   CHOICE {
    ssb                              BFR-SSB-Resource,
    csi-RS                           BFR-CSIRS-Resource
}

BFR-SSB-Resource ::=             SEQUENCE {
    ssb                              SSB-Index,
    ra-PreambleIndex                 INTEGER (0..63),
    ...
}

BFR-CSIRS-Resource ::=           SEQUENCE {
    csi-RS                           NZP-CSI-RS-ResourceId,
    ra-OccasionList                  SEQUENCE (SIZE(1..maxRA-OccasionsPerCSIRS)) OF INTEGER (0..maxRA-Occasions-1)    OPTIONAL,   -- Need R
```

TERMINAL AND RADIO COMMUNICATION METHOD

TECHNICAL FIELD

The present invention relates to a terminal and a radio communication method.

BACKGROUND ART

The 3rd Generation Partnership Project (3GPP) has specified Long Term Evolution (LTE) and LTE-Advanced (hereinafter referred to as LTE, including LTE-advanced) to further speed up LTE. Further, in the 3GPP, specifications for successor systems of LTE called 5G New Radio (NR) or Next Generation (NG), etc. are being considered.

NR specifies that if UE detects a beam failure in an SS/PBCH Block (SSB) or Channel State Information Reference Signal (CSI-RS) being received from a serving cell, the UE is to identify a new candidate beam and attempt a Beam Failure Recovery (BFR).

Currently, in NR, extending what is referred to as an inter-cell multi-transmission/reception point (TRP)/panel operation is being considered. In the operation, the UE operates across a plurality of cells of the same base station (Non-Patent Literature 1).

In an inter-cell multi-TRP/panel operation, one gNB can operate a plurality of cells by using a plurality of TRPs/panels. Therefore, the UE can receive scheduling from the plurality of TRPs/panels and transmit and receive data to and from the plurality of TRPs/panels.

CITATION LIST

Non-Patent Literature

Non-Patent Literature 1: 3GPP TSG RAN Meeting #86, RP-193133, "New WID: Further enhancements on MIMO for NR", Sitges, Spain, Dec. 9-12, 2019

SUMMARY OF THE INVENTION

As described above, in NR, a BFR is performed from detection of a beam failure to recovery of the beam failure. However, according to the current NR standard, the UE is set to monitor/use only a reference signal of a serving cell, except for a Layer 3 (L3) measurement. That is, in an inter-cell multi-TRP/panel operation, the UE can perform a BFR only with a reference signal from one TRP/panel. Therefore, the UE was not able to report beam failures or transmit BFR requests for reference signals from the TRPs/panels of non-serving cells. For this reason, even if a good connection could be obtained with other cells other than the serving cell in an inter-cell multi-TRP/panel operation, the UE sometimes determines that a beam failure is occurring. This caused an interruption of communication during operation and an unnecessary overhead or delay due to the BFR procedure.

The present invention has been made in view of such a situation and an object of the present invention is to suppress unnecessary interruptions, overheads, or delays caused due to Radio Link Monitoring (RLM) or a BFR in an inter-cell multi-TRP/panel operation.

One aspect of the present invention is a terminal (UE 200) including: a reception unit (a reception unit 220) that receives beams from a plurality of cells that include a non-serving cell and are formed by the same base station; and a control unit (a control unit 230) that determines a beam failure or a candidate beam by identifying received signals of the beams from the plurality of cells that include the non-serving cell.

One aspect of the present invention is a radio communication method including steps of: receiving beams from a plurality of cells that include a non-serving cell and are formed by the same base station; and determining a beam failure or a candidate beam by identifying received signals of the beams from the plurality of cells that include the non-serving cell.

BRIEF DESCRIPTION OF DRAWINGS

FIG. 6 is a diagram showing a setting example of RadioLinkMonitoringConfig as specified in TS38.331 (v16.1.0).

FIG. 7 is a diagram showing a setting example of BeamFailureRecoveryConfig as specified in TS38.331 (v16.1.0).

DESCRIPTION OF EMBODIMENTS

Figure 1:
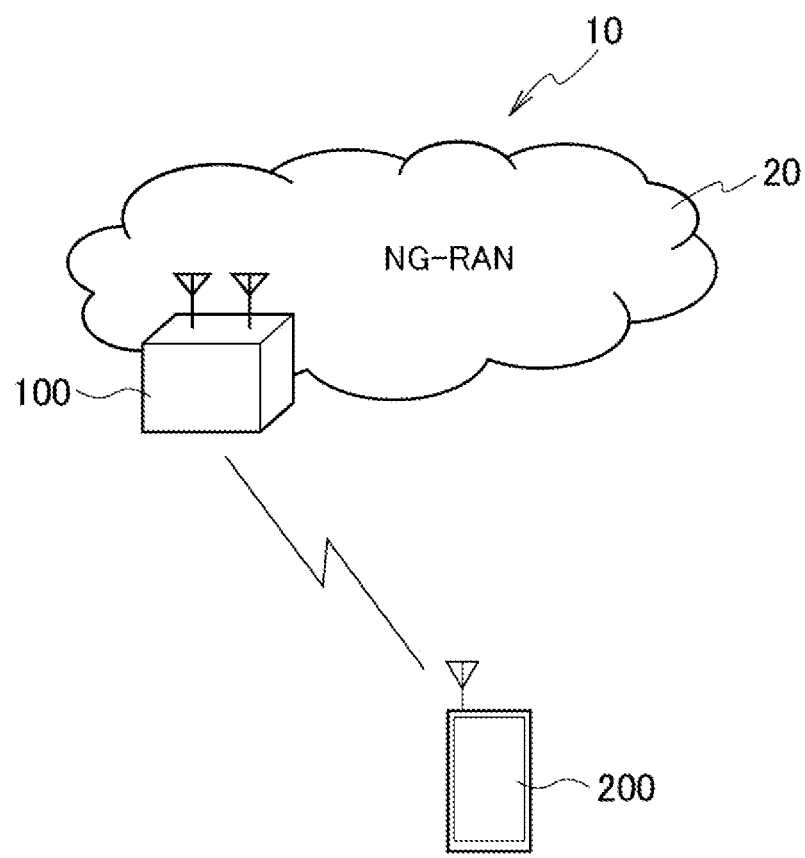
FIG. 1 is an overall schematic configuration diagram of a radio communication system 10.

Embodiments will be explained below with reference to the accompanying drawings. Note that the same or similar reference numerals have been attached to the same functions and configurations, and the description thereof is omitted as appropriate.

(1) Overall Schematic Configuration of Radio Communication System

FIG. 1 is an overall schematic configuration diagram of a radio communication system 10 according to the present embodiment. The radio communication system 10 is a radio communication system in accordance with 5G New Radio (NR) and includes a Next Generation-Radio Access Network 20 (hereinafter referred to as NG-RAN 20) and a terminal 200 (hereinafter referred to as UE 200). The radio communication system 10 supports at least one of Frequency Range (FR) 1 (410 MHz to 7.125 GHz) and FR2 (24.25 GHz to 52.6 GHz). The radio communication system 10 may support other frequency bands.

The NG-RAN 20 includes a radio base station 100 (hereinafter referred to as gNB 100). The specific configuration of the radio communication system 10 including the number of gNBs and UEs is not limited to the example shown in FIG. 1.

The NG-RAN 20 actually includes a plurality of NG-RAN Nodes, specifically gNBs (or ng-eNBs), and is connected to a 5G-compliant core network (hereinafter referred to as 5GC, not shown). The NG-RAN 20 and 5GC may simply be expressed as a "network".

The gNB 100 is a radio base station in accordance with 5G and performs radio communication in accordance with 5G with the UE 200. The gNB 100 and the UE 200 can support Massive Multiple-Input Multiple-Output (MIMO) generating a beam BM with higher directivity by controlling radio signals transmitted from a plurality of antenna elements, Carrier Aggregation (CA) bundling and using a plurality of Component Carriers (CCs), Dual Connectivity (DC) simultaneously communicating between the UE and each of the two NG-RAN Nodes, and Integrated Access and Backhaul (IAB) integrating a radio backhaul between radio communication nodes such as the gNB and radio access to the UE.

The gNB 100 has a plurality of TRPs as shown in the figure. In the present embodiment, a TRP (a Transmission/Reception Point) is a unit of transmission/reception equipment that can form a cell and may be referred to as a panel or simply an antenna. In the present embodiment, a TRP relates to the following and may be read as the following as appropriate.

CORESET (Control Resource Set) Pool Index={0, 1}

1st TCI (Transmission Configuration Index) state, 2nd TCI state

1st CDM (Code Division Multiplexing) group, 2nd CDM group (of PDSCH (Physical Downlink Shared Channel) DMRS (Demodulation Reference Signal))

1st PDSCH, 2nd PDSCH

RS port group, panel index, TCI-state/Quasi co location (QCL)/spatial-relation group index={0, 1}

The above applies to a case where there are two TRPs, and when there are more than two TPRs, the same setting can be made.

Figure 2:
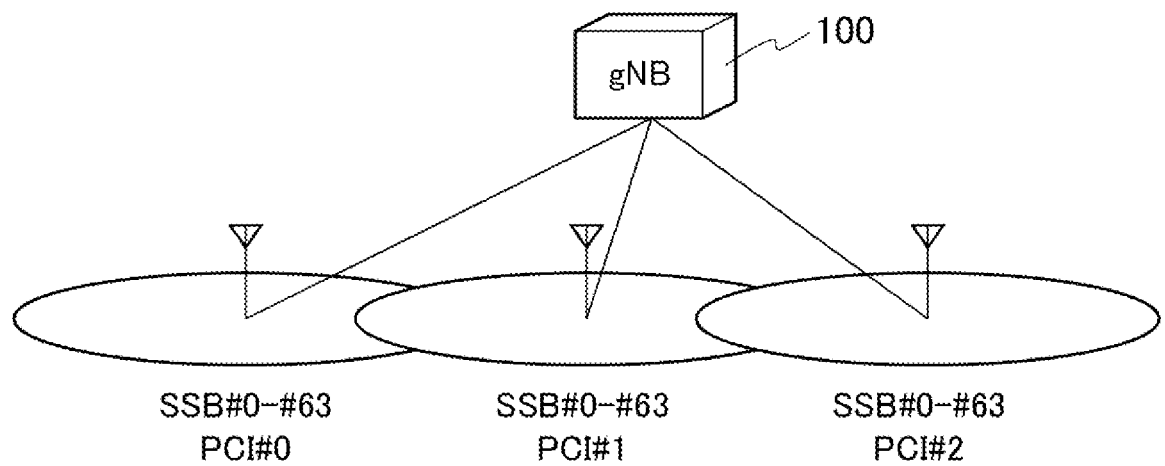
FIG. 2 is a diagram showing an example in which a gNB 100 generates three cells by using three TRPs.

The number of TRPs is not limited to the number shown in FIG. 2 (in the example of FIG. 2, the number is three). FIG. 2 shows an example in which the gNB 100 generates three cells by using three TRPs. That is, for the explanation of the present embodiment, FIG. 2 shows an example in which three cells having Physical Cell IDs (PCI) #1, PCI #2, and PCI #3 respectively are formed. Further, the gNB 100 can form serving and non-serving cells for the UE 200 by controlling the plurality of TRPs. The gNB 100 also performs control for enabling, in the UE 200, Radio Link Monitoring (RLM) for the serving and non-serving cells.

Figure 3:
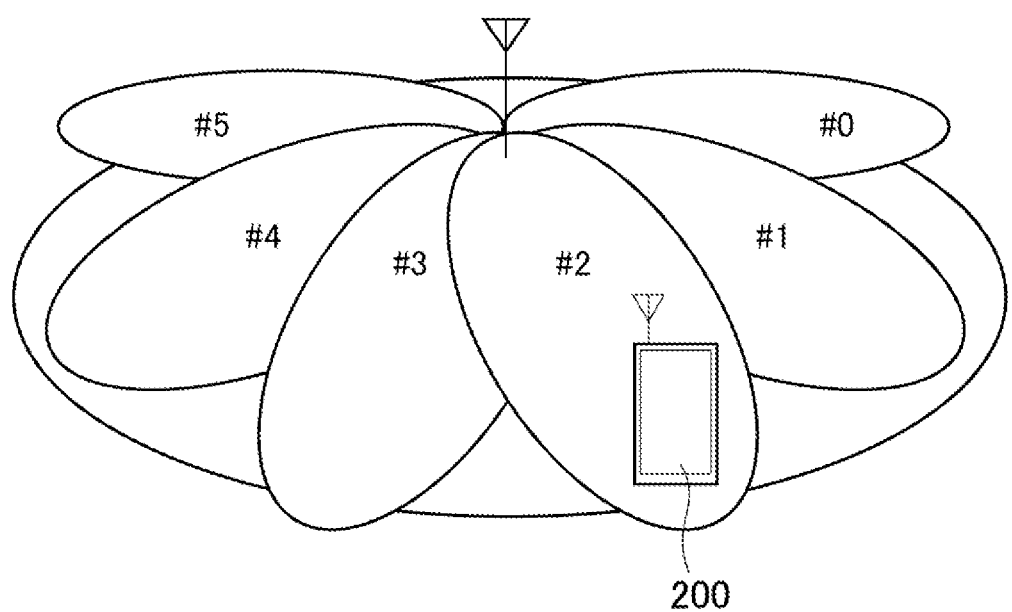
FIG. 3 is a diagram showing an example in which one TRP forms beams #0 to #5.

In NR, one serving cell can have up to 8/64 SSBs in total for the frequency ranges FR 1/2 respectively. That is, the maximum number of SSBs is determined depending on the frequency band. In the case of FR1 in which the frequency band is between 410 MHz and 7.125 GHz, the maximum number of SSBs is 8. In the case of FR2 in which the frequency band is between 24.25 GHz and 52.6 GHz, the maximum number of SSBs is up to 64. Therefore, according to the current NR standard, when performing inter-cell multi-TRP/panel operations, the gNB can have up to a number of SSBs that is at maximum 8/64× the number of TRPs in total. For one TRP, there can be up to 8/64 SSBs. The example in FIG. 2 shows that for each TRP, 64 SSBs (index for identifying SSB (SSB index) #0 to #63) are used. In the present embodiment, the TRP can form beams. FIG. 3 shows an example in which one TRP forms beams #0 to #5.

In beamforming, radio waves from the TRP are delivered in a narrowed direction. Therefore, at a certain timing, a synchronization signal can only be delivered to a part of the coverage area. For this reason, in the NR synchronization signal, a standard is established based on the assumption that a process called Beam Sweeping is performed, in which beam-formed signals are sequentially transmitted to the entire coverage area to which radio waves can be delivered from the TRP. In this case, in both the UE and the gNB, the SSB index is used to identify to which beam the captured synchronization signal corresponds. FIG. 3 shows an example in which the UE 200 captures the beam identified by SSB #2 from the TRP. In this example, for one TRP, there can be up to 64 SSBs, and therefore, the maximum number of beams used for SSB transmission is 64.

As described above, in the past, the UE could only distinguish different beams of reference and/or synchronization signals (in this example, a synchronization signal such as the SSB) from serving cells without being aware of whether there are a plurality of TRPs. On the other hand, in the present embodiment, the UE is configured to identify beams from the plurality of TRPs including non-serving cells. Information on a cell (PCI or the like) may be given in connection with the operation of monitoring a reference signal such as an SSB such that the UE 200 can observe and identify which cell the beam is from, for example. In the present embodiment, a Reference Signal (RS) may include a synchronization signal such as an SSB, but a reference signal such as a Demodulation Reference Signal (DMRS) may be distinguished from a synchronization signal such as the SSB. Therefore, in the present embodiment, a reference signal may be read as a synchronization signal. Alternatively, a synchronization signal such as a SSB may be read as a Reference Signal (RS).

(2) Function Block Configuration of Radio Communication System

Next, the function block configuration of the radio communication system 10 will be described. Specifically, the function block configuration of the UE 200 will be described.

Figure 4:
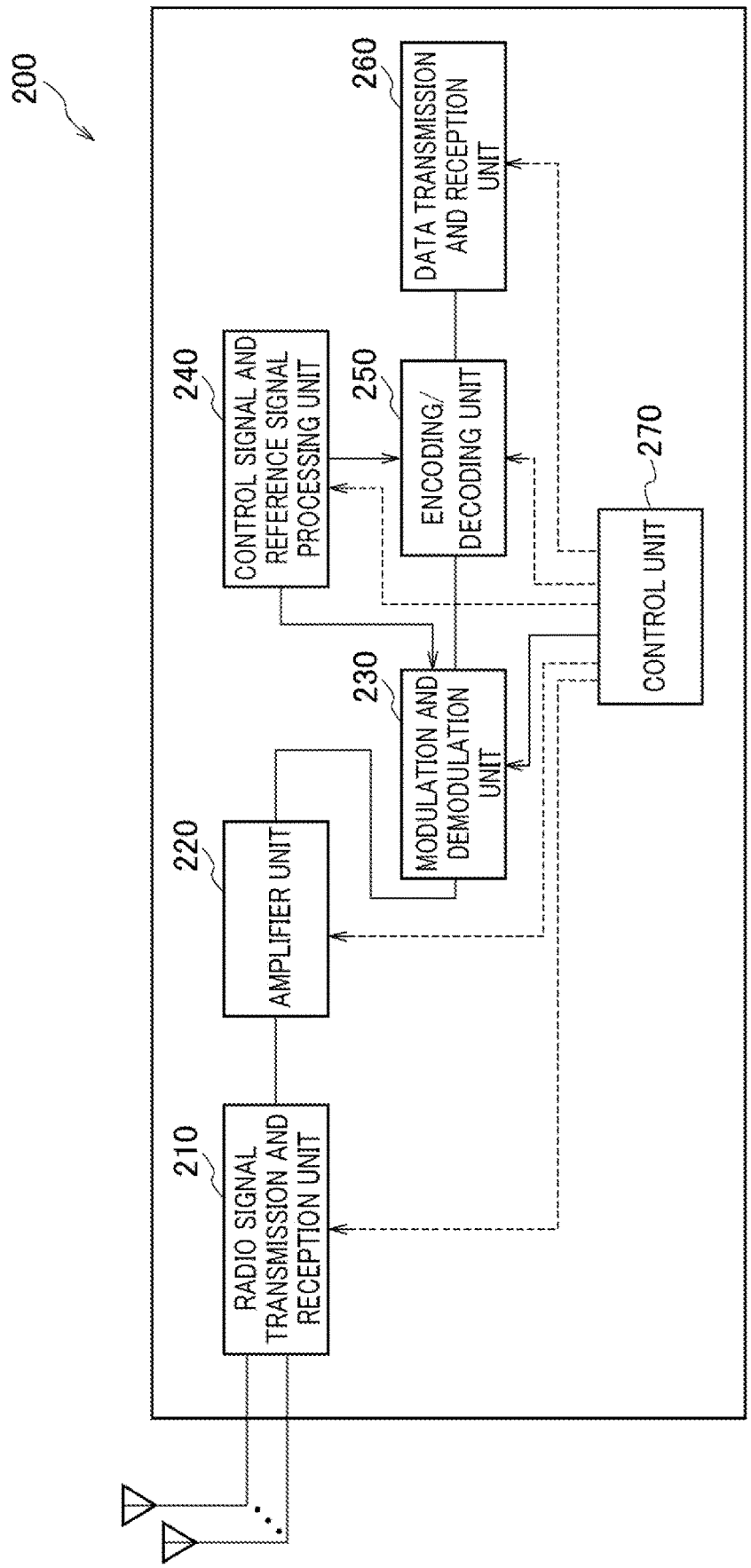
FIG. 4 is a functional block diagram of UE 200.

FIG. 4 is a functional block diagram of the UE 200. As shown in FIG. 4, the UE 200 includes a radio signal transmission and reception unit 210, an amplifier unit 220, a modulation and demodulation unit 230, a control signal and reference signal processing unit 240, an encoding/decoding unit 250, a data transmission and reception unit 260, and a control unit 270.

The radio signal transmission and reception unit 210 transmits and receives radio signals in accordance with NR. The radio signal transmission and reception unit 210 supports Massive MIMO, CA bundling and using a plurality of CCs, and DC communicating simultaneously between the UE and each of the two NG-RAN Nodes.

Figure 5:
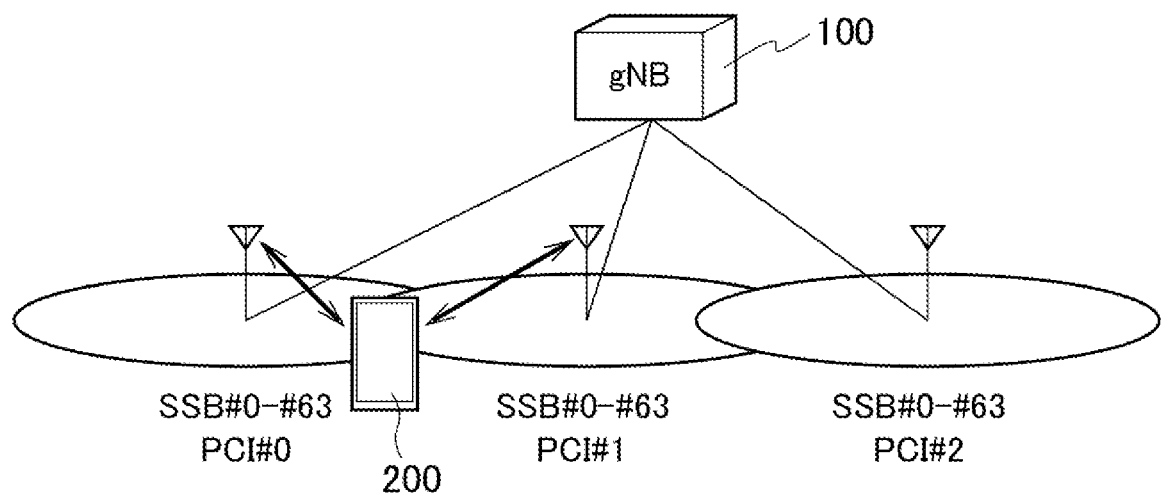
FIG. 5 is a diagram showing an example in which UE 200 receives beams from two cells (cells of PCI #0 and PCI #1) formed by the same gNB 100.

In the present embodiment, the radio signal transmission and reception unit 210 includes a reception unit that receives beams from a plurality of cells (a plurality of cells including the non-serving cells) formed by the same base station (the gNB 100). FIG. 5 shows an example in which the UE 200 receives beams from two cells (cells of PCI #0 and PCI #1) formed by the same gNB 100. The serving cell of the present embodiment can be set as a cell currently accessed by the UE 200, for example. The non-serving cell of the present embodiment can be set as one or more cells other than the serving cell, for example. Further, in the present embodiment, the serving cell may be set as a PCell (Primary Cell) or PSCell (Primary Secondary Cell) and at least one non-serving cell may be set in association with a PCell or PSCell, for example. In addition, according to the present embodiment, in the case as exemplified in FIG. 5, one of the two cells of PCI #0 and PCI #1 may be set as a serving cell, and the other of the two cells may be set as a non-serving cell. The radio signal transmission and reception unit 210 may receive information (setting information or the like) on the reference signal (SSB and the like) from each cell.

In the present embodiment, as an example, cell identification information (PCI or the like) is assigned to information on the reference signal (SSB or the like) from each cell. On the other hand, as described later, the network (the gNB 100) may not transmit the individual SSBs from the plurality of cells at the same time position (may be read as a time resource, a time domain or the like) but may transmit signals with a guard time of 1 to several symbols before and after. This enables the radio signal transmission and reception unit 210 to reliably obtain individual received signals from the plurality of cells. The received signals are not limited to SSBs, and may be CSI-RSs or other reference signals, or control or data signals with transmission configuration indexes (TCI) set.

The radio signal transmission and reception unit 210 may be further configured as a transmission unit that transmits at least one of the pieces of the following capability information.

Capability information indicating the capability of detecting beam failures of cells including the non-serving cell Capability information indicating the capability of performing recovery from beam failures of cells including the non-serving cells Capability information indicating the capability of detecting candidate beams of cells including the non-serving cells In addition, the capability information of the UE 200 may be the UE capability information specified in 3GPP TS38.306 and the like.

Further, the radio signal transmission and reception unit 210 may be configured as a transmission unit that transmits a Beam Failure Recovery request (a BFR request) of a Non-Serving Cell (NSC) or a Serving Cell (SC) to the Serving Cell (SC) or the Non-Serving Cell (NSC). That is, the radio signal transmission and reception unit 210 may transmit the BFR request by means of any of the following.

Transmitting BFR request of NSC to SC
Transmitting BFR request of SC to NSC
Transmitting BFR request of SC to SC
Transmitting BFR request of NSC to NSC The amplifier unit 220 includes a Power Amplifier (PA)/Low Noise Amplifier (LNA) or the like. The amplifier unit 220 amplifies a signal output from the modulation and demodulation unit 230 to a predetermined power level. Further, the amplifier unit 220 amplifies an RF signal output from the radio signal transmission and reception unit 210.

The modulation and demodulation unit 230 performs data modulation/demodulation, transmission power setting, resource block allocation, and the like for each predetermined communication destination (the gNB 100 or another gNB, or each cell).

The control signal and reference signal processing unit 240 performs processing regarding various control signals transmitted and received by the UE 200 and processing regarding various reference signals transmitted and received by the UE 200.

Specifically, the control signal and reference signal processing unit 240 receives various control signals transmitted from the gNB 100 via a predetermined control channel, for example, control signals such as a higher-layer signal and an RRC parameter. Further, the control signal and reference signal processing unit 240 transmits various control signals to the gNB 100 via the predetermined control channel.

Further, the control signal and reference signal processing unit 240 performs processing using Reference Signals (RSs) such as a Demodulation Reference Signal (DMRS), a Phase Tracking Reference Signal (PTRS), and the like.

A DMRS is a terminal-specific reference signal (a pilot signal) known between a base station and a terminal for estimating a fading channel used for data demodulation. A PTRS is a terminal-specific reference signal for the purpose of estimating phase noise, which becomes a problem in a high frequency band.

In addition to the DMRS and the PTRS, reference signals include a Channel State Information-Reference Signal (CSI-RS) and a Sounding Reference Signal (SRS).

Further, the channel includes a control channel and a data channel. The control channel includes a Physical Downlink Control Channel (PDCCH), a Physical Uplink Control Channel (PUCCH), a Random Access Channel (RACH), Downlink Control Information (DCI) including a Random Access Radio Network Temporary Identifier (RA-RNTI), and a Physical Broadcast Channel (PBCH).

Further, the data channel includes a Physical Downlink Shared Channel (PDSCH), a Physical Downlink shared Channel (PUSCH), and the like. The data means data transmitted via a data channel.

The encoding/decoding unit 250 performs data division/connection, channel coding/decoding, and the like for each predetermined communication destination (the gNB 100 or another gNB, or each cell).

Specifically, the encoding/decoding unit 250 divides the data output from the data transmission and reception unit 260 into predetermined sizes, and performs channel coding on the divided data. The encoding/decoding unit 250 decodes the data output from the modulation and demodulation unit 230 and connects the decoded data.

The data transmission and reception unit 260 transmits and receives a Protocol Data Unit (PDU) and a Service Data Unit (SDU). Specifically, the data transmission and reception unit 260 performs assembly/disassembly and the like of PDUs/SDUs in a plurality of layers (a medium access control layer (MAC), a radio link control layer (RLC), and a packet data convergence protocol layer (PDCP), and the like). Further, the data transmission and reception unit 260 transmits a hybrid automatic repeat request (ARQ). The data transmission and reception unit 260 may perform data error correction and retransmission control based on the hybrid ARQ.

The control unit 270 controls individual functional blocks that configure the UE 200. In particular, in the present embodiment, the control unit 270 identifies received signals of beams from a plurality of cells including the Non-Serving Cells (NSCs). This enables the control unit 270 to determine a beam failure and/or candidate beam based on beam qualities (for example, RSRP) of Serving Cells (SCs) and Non-Serving Cells (NSCs). The control unit 270 may determine the occurrence of a beam failure based on the reception quality (for example, RSRP) of the plurality of beams, for example. More specifically, the control unit 270 may determine that a beam failure has occurred if the reception quality (for example, RSRP) of all of the plurality of beams is equal to or less than a predetermined threshold, or is less than the predetermined threshold. Further, the control unit 270 may select a candidate beam based on signal quality (for example, RSRP) of a plurality of candidate beams. The control unit 270 may select a new beam among the plurality of candidate beams based on a predetermined threshold (for example, a beam in which the signal quality is more than a threshold, or the like). The control unit 270 may select, as a new beam, the beam with the best signal quality among the plurality of candidate beams.

The control unit 270 assumes that information for identifying cells including the Non-Serving Cells NSCs (a Physical Cell ID (PCI) or the like) is included in a part or both of the received signal and information on the received signal (for example, reference signal information, setting information on the reference signal, or the like). This enables the control unit 270 to specify which beam from which cell to monitor by using cell identification information (PCI or the like) together with conventional reference signal information (an SSB index or the like). Therefore, the control unit 270 can determine the beam failure or candidate beam based not only on the beam from the serving cell but also on the signal quality (for example, Reference Signal Received Power (RSRP)) of the beam of the non-serving cell. If a good connection (for example, sufficient RSRP) can be obtained from a non-serving cell, the control unit 270 does not determine that the beam failure has occurred, for example. This can suppress unnecessary interruptions, overheads, or delays due to a BFR.

Beam failure recovery is sometimes collectively referred to as beam failure/recovery because it involves detection of beam failures. Therefore, in the present embodiment, "beam failure" may include the recovery of a beam failure as a concept. Alternatively, in the present embodiment, "beam failure" may be performed by reading "beam failure" as "beam failure recovery" and vice versa. Similarly, "Candidate Beam Detection (CBD)" may be performed by reading it as "Beam Failure Detection (BFD)" and vice versa. As an example, beam failure/recovery is performed by means of the following four steps:

(1) Beam-failure detection: The UE detects that a beam failure is occurring.
(2) Candidate-beam identification: The UE attempts to identify a new beam. More specifically, the UE attempts to identify new beam pairs based on a criteria regarding with which connections the failure can be recovered.
(3) Recovery-request transmission: The UE transmits a recovery request to the network.
(4) The network responds to the beam recovery request In the present embodiment, the UE 200 may determine whether a beam failure occurs based on signals of beams from not only the Serving Cell (SC) but also the Non-Serving Cell (NSC) when detecting a beam failure of (1). The UE 200 may determine a new beam based on the signals of the beams from not only the Serving Cell (SC) but also the Non-Serving Cell (NSC) when identifying a candidate beam of (2). In other words, the UE 200 may determine whether to transmit a beam failure recovery request based on the signals of the beams from not only the Serving Cell (SC) but also the Non-Serving Cell (NSC). Further, the UE 200 may determine whether to perform beam failure recovery based on signals of the beams from not only the Serving Cell (SC) but also the Non-Serving Cell (NSC).

The control unit 270 may set the threshold (for example, the RSRP threshold (unit: [dBm] or [W (Watt)])) for detecting a candidate beam or detecting a beam failure from the non-serving cells to the same value, a different value, or a value with an offset, compared to the threshold for detecting a candidate beam or detecting a beam failure from the serving cells.

The control unit 270 may also assume that at the same symbol and/or one to several symbols before and after the symbol of the resource of the received signal of the non-serving cell, transmission to or reception from the serving cell is not performed. As described above, signals are transmitted from the gNB 100 with a guard time of several symbols before and after so that signals from the plurality of cells do not compete with each other. Therefore, the control unit 270 can reliably obtain received signals of beams not only from the serving cell but also from the non-serving cell.

(3) Operation of Radio Communication System

Next, the operation of the radio communication system 10 will be described.

(3.0) Reference to Prior Art

In explaining the following operation examples, the underlying prior art and the conventional operation examples will be explained first.

FIG. 6 shows a setting example of RadioLinkMonitoringConfig as specified in TS38.331 (v16.1.0). The Reference Signal (RS) for Beam Failure Detection (BFD) is set for the serving cell by the RRC signaling. However, as shown in FIG. 6, there is no IE (Information Element)/field for displaying the cell ID, and it is not possible to set the Reference Signal (RS) transmitted from the non-serving cell for the BFD. Therefore, in the present embodiment, as an example, by adding an IE (Information Element)/field displaying the cell ID and enabling the UE 200 to specify the cell ID, the beam signals of not only the serving cell but also the non-serving cell can be referred to for the BFD.

Further, FIG. 7 shows a setting example of BeamFailureRecoveryConfig as specified in T538.331 (v16.1.0). As described above, candidate signals (SSB, CSI-RS, and the like) for Beam Failure Recovery (BFR) and the like are set for the serving cell. However, as shown in FIG. 7, there is no IE (Information Element)/field for displaying the cell ID, and the signals (SSB, CSI-RS, and the like) transmitted from the non-serving cell may not be set for the BFR. Therefore, in the present embodiment, as an example, by adding the IE (Information Element)/field for displaying the cell ID and enabling the UE 200 to identify the cell ID, beam signals of not only the serving cell but also the non-serving cell can be referred for the BFR.

Figure 8:
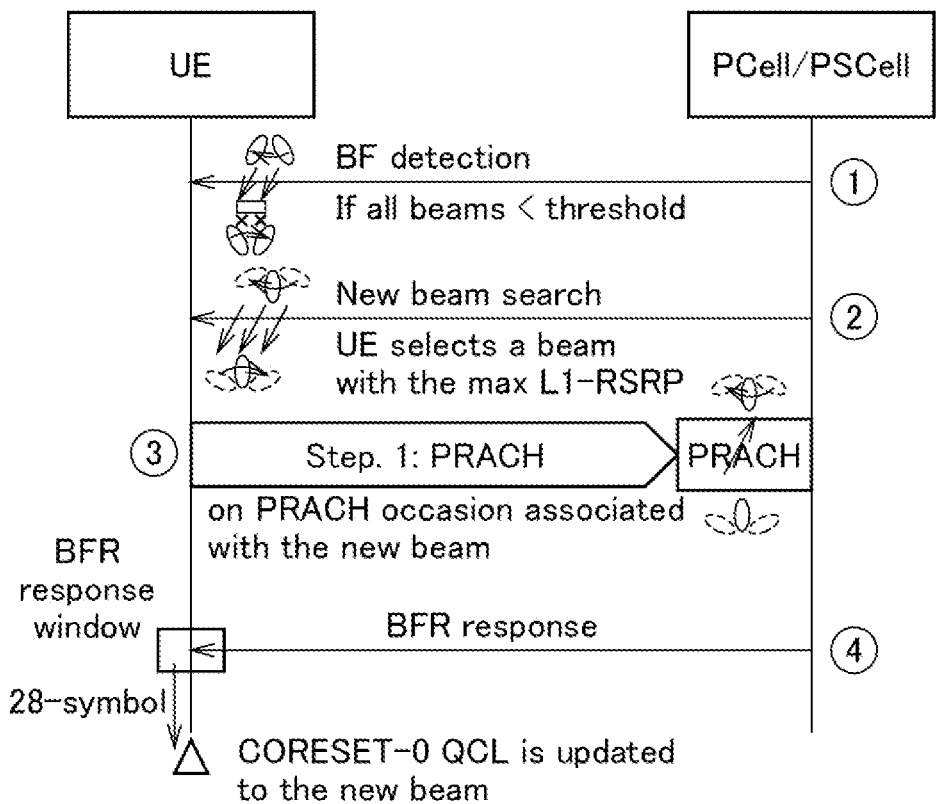
FIG. 8 is a flowchart showing the operating procedure of a Beam Failure Recovery (BFR) in a Pcell/PScell as specified in 3GPP Release 15.
Figure 9:
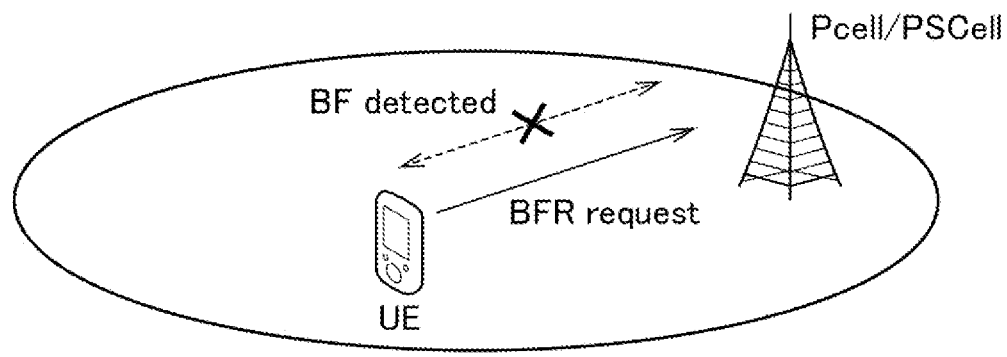
FIG. 9 is an overall schematic diagram for explaining a BFR in a Pcell/PScell as specified in 3GPP Release 15.

FIG. 8 is a flowchart showing the operating procedure of Beam Failure Recovery (BFR) in a Pcell/PScell as specified in 3GPP Release 15. Further, FIG. 9 is an overall schematic diagram for explaining a BFR in a Pcell/PScell as specified in 3GPP Release 15. That is, if a Beam Failure (BF) occurs between a Pcell/PScell and UE, the UE transmits a BFR request to the Pcell/PScell in one step.

More specifically, as shown in FIG. 8, if the UE detects a Beam Failure (BF) by determining the quality of all beams from the Pcell/PSCell (for example, RSRP) based on a threshold (for example, if RSRS or the like is less than a threshold, or is equal to or less than the threshold) (step 1), the UE searches for a new candidate beam (step 2). Specifically, the UE selects, among the received signals of beams, the signal having the highest L1 (Layer 1)-RSRP (Reference Signal Received Power).

Then, the UE transmits a one-step BFR request to the PCell/PSCell at a PRACH occasion associated with the selected new beam (step 3).

The PCell/PSCell transmits a BFR response to the UE in response to the received BFR request (step 4). Thereafter, the UE receives the BFR response at the timing of a BFR response window. The BFR is completed by updating the Quasi Co Location (QCL) of Control Resource Set (CORESET) 0 to a new beam by the time 28 symbols later.

Figure 10:
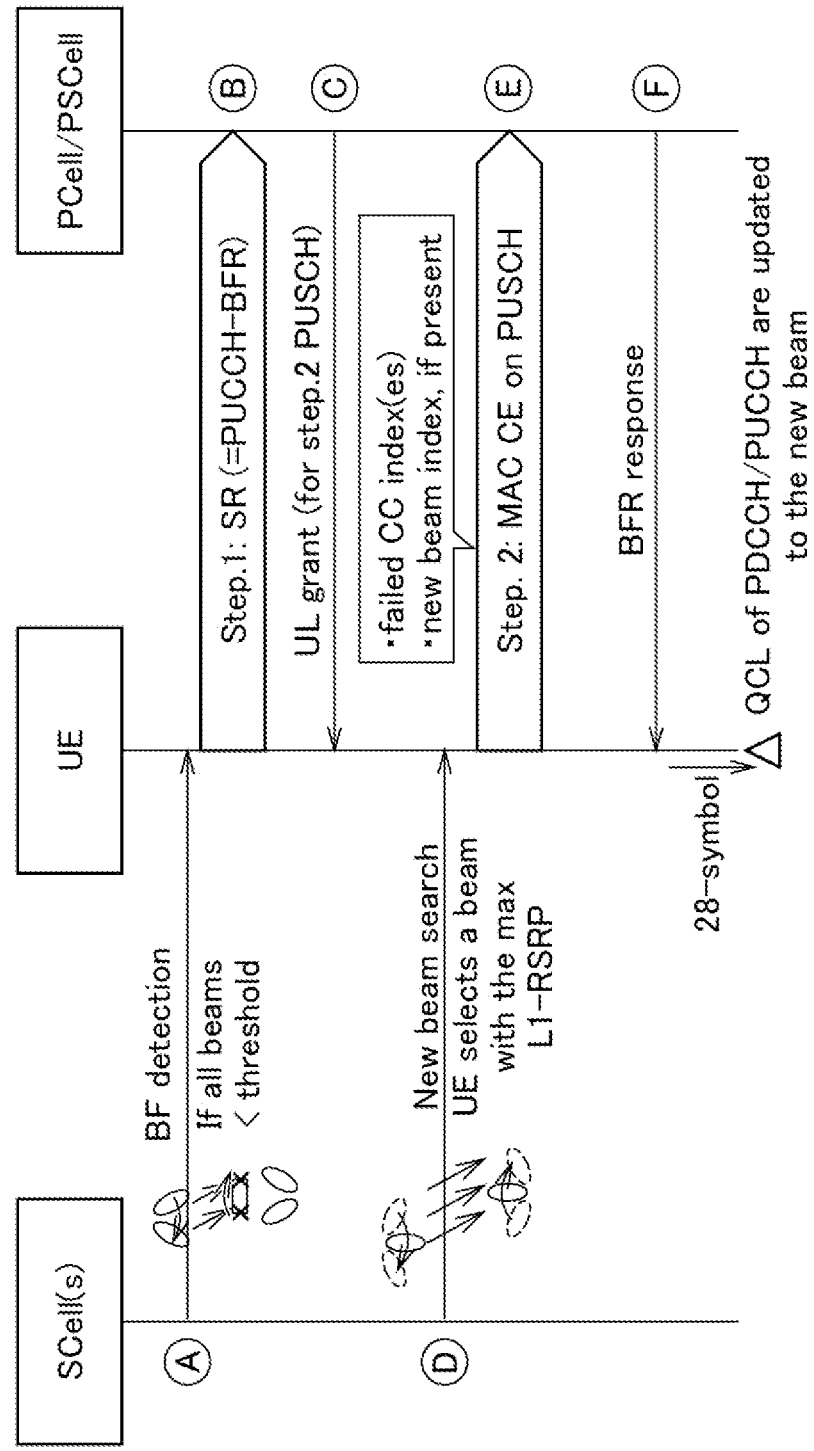
FIG. 10 is a flowchart showing the operating procedure of a Beam Failure Recovery (BFR) in an Scell as specified in 3GPP Release 16.
Figure 11:
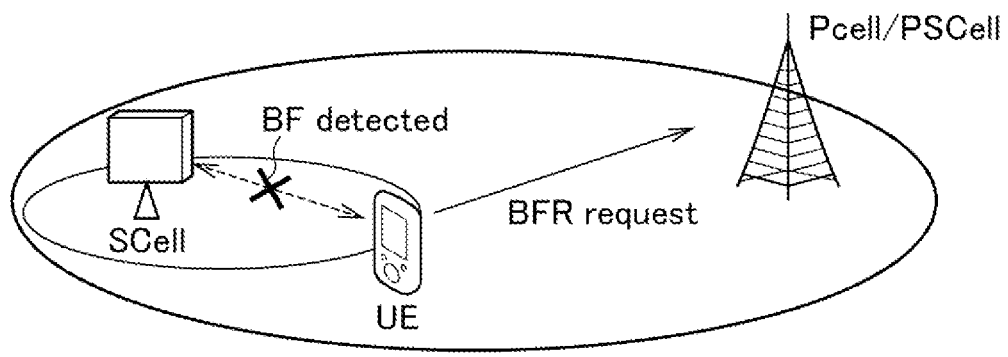
FIG. 11 is an overall schematic diagram for explaining a BFR in an Scell as specified in 3GPP Release 16.

In the case of an SCell's beam failure, the following two-step BFR request is made. FIG. 10 is a flowchart showing the operating procedure of a Beam Failure Recovery (BFR) in an Scell as specified in 3GPP Release 16. FIG. 11 is an overall schematic diagram for explaining a BFR in an Scell as specified in 3GPP Release 16. That is, if a Beam Failure (BF) occurs between the Scell and the UE, the UE transmits a BFR request to the Pcell/PScell in two steps.

Specifically, as shown in FIG. 10, suppose that the UE detects a Beam Failure (BF) by determining that all beams from the SCell are less than the threshold (step A), the UE transmits a Scheduling Request (SR) in the two-step BFR request to the Pcell/PScell via a PUCCH as the first step (step B).

In response to the received SR, the PCell/PScell transmits an uplink (UL) grant to the UE for a PUSCH transmission of the second step of the two-step BFR request (step C).

Then, the UE searches for a new candidate beam (step D). Specifically, the UE selects, as a new beam, the candidate beam signal having the largest L1-RSRP among a plurality of candidate beam signals received from the Scell.

Then, as the second step of the two-step BFR request, the UE transmits a MAC Control Element (MAC CE) including the failed Component Carrier (CC) index and the selected new beam's beam index to the PCell/PScell via a PUSCH allowed in the UL grant (step E).

The PCell/PScell transmits a BFR response to the UE in response to the received BFR request of step 2 (step F). Thereafter, the UE receives the BFR response at the timing of the BFR response window. The BFR is completed by updating the Quasi Co Location (QCL) of the PDCCH/PUCCH to a new beam by the time 28 symbols later.

In the present embodiment, the above described one-step BFR request and two-step BFR request are applied and modified to be used for a BFR for the non-serving cell. The operation examples of the present embodiment will be described below. The following operation examples may be performed in any combination.

(3.1) Operation Example 1

A description will be given regarding support for setting Reference Signals (RSs) of non-serving cell TRPs for Beam Failure Detection (BFD) and/or Candidate Beam Detection (CBD).

Specifically, in a Radio Link Monitoring (RLM) RS, BFR-SSB-Resource, and/or BFR-CSIRS-Resource, a new Information Element (IE) for displaying a cell ID is introduced, for example. If there is no new IE for the cell ID, as in the past, the UE 200 may assume the BFD/CBD RS for the serving cell.

Further, the UE 200 may assume that at least one of the reference signals RSs set for the BFD/CBD is for the serving cell.

For the reference signal RS set for the non-serving cell TRP, any one of the following may be adopted.
- Limited to SSB (not CSI-RS).
- Limited to CSI-RS (not SSB).
- Not particularly limited (allow a mix of SSB and CSI-RS settings).

Figure 12:
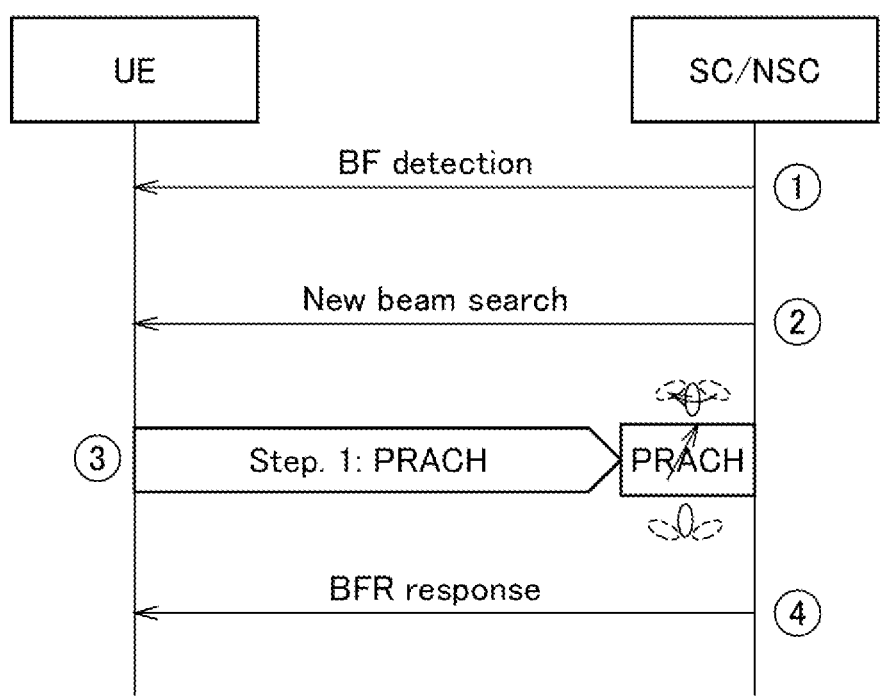
FIG. 12 is a flowchart showing an example of the operating procedure (one-step BFR request) of a Beam Failure Recovery (BFR) including a serving cell (SC) and a non-serving cell (NSC).

FIG. 12 is a flowchart showing an example of the operating procedure (one-step BFR request) of a Beam Failure Recovery (BFR) including a Serving Cell (SC) and a Non-Serving Cell (NSC).

As shown in FIG. 12, the UE 200 detects a beam failure (BF) (step 1). The UE 200 may determine the occurrence of a beam failure by determining a reception quality such as the RSRP of beams from SC and NSC based on a threshold, for example. The UE 200 may determine that a beam failure is occurring if the reception quality (for example, RSRP) of all of the plurality of beams is equal to or less than a predetermined threshold, or is less than the predetermined threshold, for example.

If the UE 200 determines that a BF has occurred, the UE 200 searches for a new candidate beam (step 2). Specifically, the UE 200 may select a new beam based on the qualities of beam signals received from the serving and non-serving cells (for example, RSRP). The UE 200 may select, as a new beam, a signal with the highest RSRP among the beam signals received from serving and non-serving cells, for example.

The UE 200 then transmits a one-step BFR request to the network on the PRACH occasion associated with the selected new beam (step 3). The UE 200 may transmit the BFR request of the SC's beam failure to either the SC or the NSC.

After the SC/NSC transmits the BFR response to the UE 200 (step 4) in response to the received BFR request, the UE 200 receives the BFR response, and completes the BFR by updating the Quasi Co Location (QCL) of Control Resource Set (CORESET) 0 to a new beam, and the like.

Figure 13:
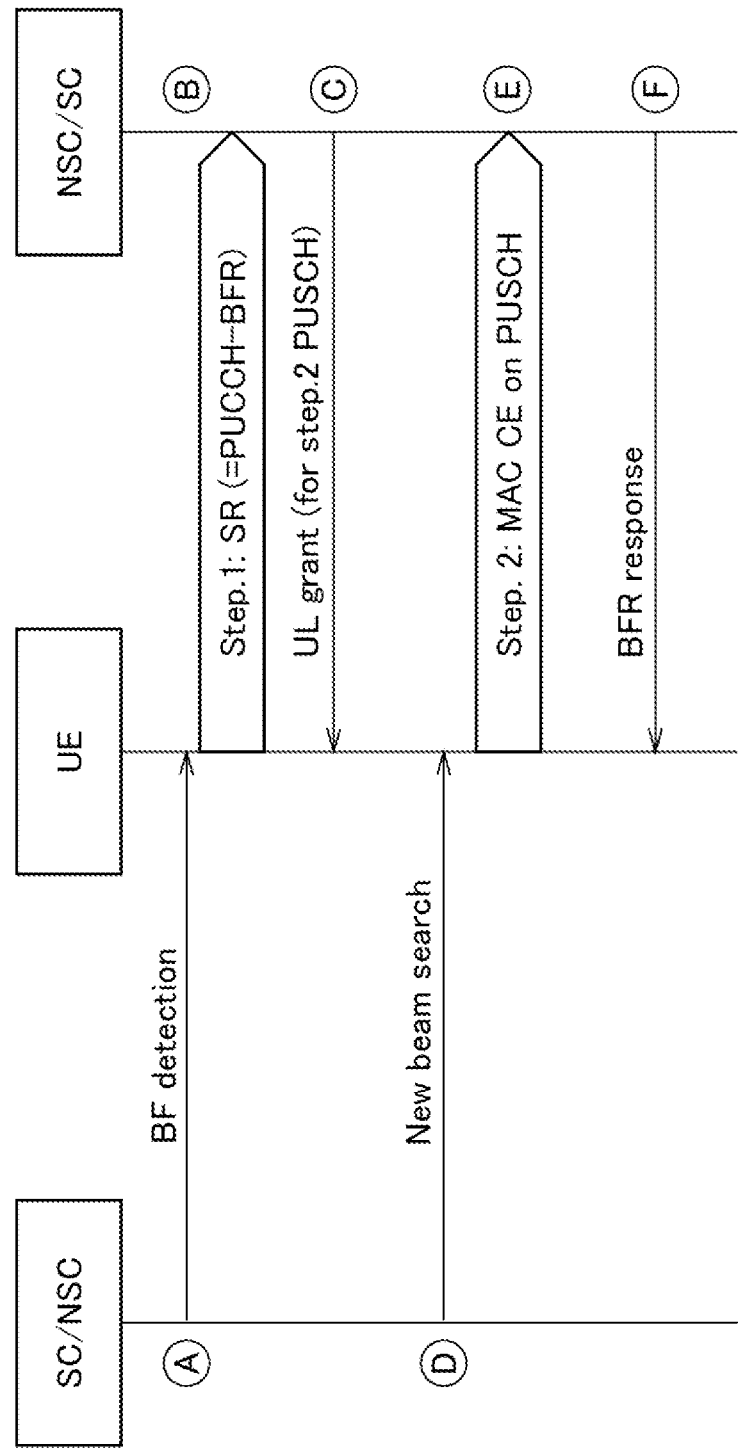
FIG. 13 is a flowchart showing an example of the operating procedure (two-step BFR request) of a Beam Failure Recovery (BFR) in SC/NSC.

If a two-step BFR request is made, the following applies. FIG. 13 is a flowchart showing an example of the operating procedure (two-step BFR request) of Beam Failure Recovery (BFR) in the SC/NSC. That is, if a Beam Failure (BF) occurs between the SC/NSC and the UE, the UE 200 transmits a BFR request to the NSC/SC in two steps.

Specifically, as shown in FIG. 13, suppose that the UE 200 detects a Beam Failure (BF) by determining that the quality of the received signals of beams from the SC and NSC (for example, RSRP) is less than a threshold (step A), the UE 200 transmits a Scheduling Request (SR) as the first step of the two-step BFR request to the network via a PUCCH (step B). That is, the UE may transmit the BFR request of the first step to either the NSC or the SC.

In response to the received SR, the NSC/SC transmits a UL grant to the UE 200 for the PUSCH transmission of the second step of the two-step BFR request (step C).

The UE 200 then searches for a new candidate beam (step D). Specifically, the UE may select, as a new beam, a signal with the highest signal quality (for example, RSRP) among the beam signals received from the SC and NSC.

The UE 200 then transmits the MAC CE including the failed CC index and the selected new beam's beam index to the NSC/SC via a PUSCH allowed in the UL grant as the second step of the two-step BFR request (step E). In the CC index and/or beam index, the conventional information identifying beam may be extended and cell Identification Information (cell ID or the like) identifying cell may be included.

After the NSC/SC transmits a BFR response to the UE 200 in response to the received BFR request of step 2 (step F), the UE receives the BFR response, and completes the BFR by updating the Quasi Co Location (QCL) of the PDCCH/PUCCH to a new beam.

This concludes the explanation of operation example 1. In this operation example, the following options may be adopted.

(3.1.1) Option 1

The following may be adopted as RSRP thresholds for determining CBD.

(Alt.1) The RSRP threshold (rsrp-ThresholdSSB or rsrp-ThresholdBFR-r16) for Candidate Beam Detection (CBD) of the non-serving cell may be the same as the RSRP threshold (rsrp-ThresholdSSBm or rsrp-ThresholdBFR-r16) for CBD of the serving cell. In this case, there is no need to provide an explicit setting for the non-serving cell.

(Alt.2) The RSRP threshold (rsrp-ThresholdSSB or rsrp-ThresholdBFR-r16) for Candidate Beam Detection (CBD) of the non-serving cell may be set separately from the RSRP threshold (rsrp-ThresholdSSBm or rsrp-ThresholdBFR-r16) for CBD of the serving cell. For the non-serving cell, a separate RSRP threshold parameter may be set, or a parameter indicating an offset value from the threshold of the serving cell may be set, for example. The UE 200 may assume that the threshold for the non-serving cell is higher than the threshold for the serving cell. In this case, frequent beam switching can be suppressed.

(3.1.2) Option 2

In this operation example 1, the following scheduling options may be adopted. The following may be performed only when the conditions of 8.5.7 (8.5.8) of TS38.133 are satisfied.

(Alt.1) The UE 200 does not assume that transmission of a PUCCH, PUSCH, or SRS and/or reception of a PDCCH, PDSCH, CSI-RS for tracking, or a CSI-RS for CQI are performed at the RS resource symbol measured for BFD/CBD (as per current regulations).

(Alt.2) When measuring the RS resource from the non-serving cell TRP for the BFD/CBD, the UE 200 does not assume that transmission of a PUCCH, PUSCH, or SRS and/or reception of a PDCCH, PDSCH, CSI-RS for tracking, or CSI-RS for CQI are performed relative to the serving cell at the same symbol and/or at least one symbol before and after the symbol of the RS resource for the BFD/CBD. That is, when the UE 200 receives the RS of the NSC, the UE 200 has only to form a reception beam therefor. The UE 200 does not form another transmission and reception beam for the SC in the same time-frequency resource. This enables the UE 200 to reliably receive the reference signal from the NSC.

(3.1.3) Option 3

In this operation example 1, the following may be adopted as the destination of the BFR request.

(Alt.1) If the UE 200 determines a BFD in the non-serving cell, the UE 200 may transmit a BFR request to the serving cell with a PRACH/PUCCH/PUSCH/MAC CE.

(Alt.2) If the UE 200 determines a BFD in the serving cell, the UE 200 may transmit a BFR request to the serving cell with a PRACH/PUCCH/PUSCH/MAC CE.

(Alt.3) If the UE 200 determines a BFD in the non-serving cell, the UE 200 may transmit a BFR request to the non-serving cell with a PRACH/PUCCH/PUSCH/MAC CE.

(Alt.4) If the UE 200 determines a BFD in the serving cell, the UE 200 may transmit a BFR request to the non-serving cell with a PRACH/PUCCH/PUSCH/MAC CE.

The above BFR request may include information indicating whether a BFD/BFR is a BFD/BFR in the serving cell or a BFD/BFR in the non-serving cell. Therefore, any one of the following may be adopted.

1) Different PRACH preambles/PUCCH resources are set for the serving or non-serving cell, and the UE 200 selects any one of them in accordance with the BFD in the serving or non-serving cell.

2) A new bit field indicating the serving or non-serving cell is introduced in a BFR MAC CE. The new bit field may be a single bit or a plurality of bits indicating the serving cell ID, for example.

(3.2) Operation Example 2

In this operation example, the UE 200 transmits, to the network, capability information on beam detection (beam failure) of cells including the non-serving cell. The UE 200 may transmit, to the network, at least one of the following pieces of capability information (UE capability information and the like), for example.

Capability information indicating capability of detecting beam failures of cells including the non-serving cell Capability information indicating capability of performing recovery from beam failures of cells including the non-serving cell Capability information indicating the capability of detecting candidate beams of cells including the non-serving cell As a specific example, the UE 200 may transmit, to the network (the gNB 100 and the like), capability information indicating capability of supporting a BFR using an RS from the non-serving cell TRP. Only when the UE 200 indicates the support capability, the RS for non-serving cell TRP is set by the network for BFD/CBD.

The pieces of capability information listed above may be collected as one piece of information or separated into separate pieces of information. Specifically, the following may be separated as separate capabilities or grouped into one capability: the capability of performing BFD based on the CSI-RS of the non-serving cell; the capability of performing CBD based on the SSB of the non-serving cell; and the capability of performing CBD based on the CSI-RS of the non-serving cell.

(4) Action and Effect

According to the above embodiment, the following effects can be obtained. As described above, the UE 200 receives beams from the plurality of cells (NSC and SC) of the gNB 100, and determines a beam failure or a candidate beam by identifying received signals of beams from the plurality of cells.

That is, the UE 200 can identify not only the received signal of the beam from the SC as in the past but also the received signal of the beam from the NSC.

The UE 200 can then determine a beam failure or a candidate beam based on the received signals of beams of the SC and NSC.

Therefore, even if the received signal of the beam from the SC is not good, if the received signal of the beam from the NSC is good, the UE 200 does not need to determine that a beam failure has occurred and does not need to search for a new candidate beam.

Therefore, it is possible to suppress unnecessary interruptions, overheads, or delays due to RLM or a BFR in inter-cell multi-TRP/panel operations.

In the present embodiment, the UE 200 assumes that the cell identification information including the NSC is included in a part or both of the received signal and information on the received signal. Therefore, the UE 200 can efficiently identify from which cell the beam signal is transmitted.

Further, in the present embodiment, the UE 200 transmits, to the network (SC or NSC of the gNB 100, or the like), capability information indicating at least one of the following: (1) the capability of detecting beam failures of cells including the NSC, (2) the capability of performing recovery from the beam failures of the cells including the NSC, and/or (3) the capability of detecting candidate beams of the cells including the NSC. For this reason, the network can set signal information from which the NSC can be identified for the UE 200 which indicates the capability.

Further, in the present embodiment, the UE 200 can set the threshold of the CBD or BFD for the NSC to the same value, a different value, or a value with an offset, compared with the threshold of the CBD or BFD for the SC. This enables simplifying the setting by using the same threshold and suppressing frequent beam switching by using a different threshold such as a value with an offset.

Further, in the present embodiment, the UE 200 can assume that, at the same symbol and/or several symbols before and after the symbol of the resource of the received signal of the NSC, no transmission to or reception from the SC is performed. This enables the UE 200 to reliably acquire the received signal of the beam from the NSC.

In the present embodiment, the BFR request of the NSC or SC can be transmitted to the SC or NSC. This enables avoiding failing connections and having flexible network configurations.

(5) Other Embodiments

Although the contents of the present invention have been described in accordance with the embodiment, the present invention is not limited to the descriptions, and it is obvious to those skilled in the art that various modifications and improvements are possible.

In the above described embodiment, "determination" for BFD/BFR/CBD may be read as "detection" or "decision", and conversely, "detection" may be read as "determination" or "decision".

Further, in the above described embodiment, it may be assumed that there are cases of both a BFR of a Pcell/PScell and a BFR of an Scell. Different CC indexes may be provided to indicate a Pcell or Scell, for example. Different PCIs may be set to indicate an SC or NSC.

The block diagram (FIG. 4) used in the description of the above-described embodiment shows blocks in units of functions. Those functional blocks (components) can be realized by a desired combination of at least one of hardware and software. A realization method for each functional block is not particularly limited. That is, each functional block may be realized by using one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that makes a transmitting function work may be called a transmitting unit or a transmitter. For any of the above, as explained above, the realization method is not particularly limited.

Figure 14:
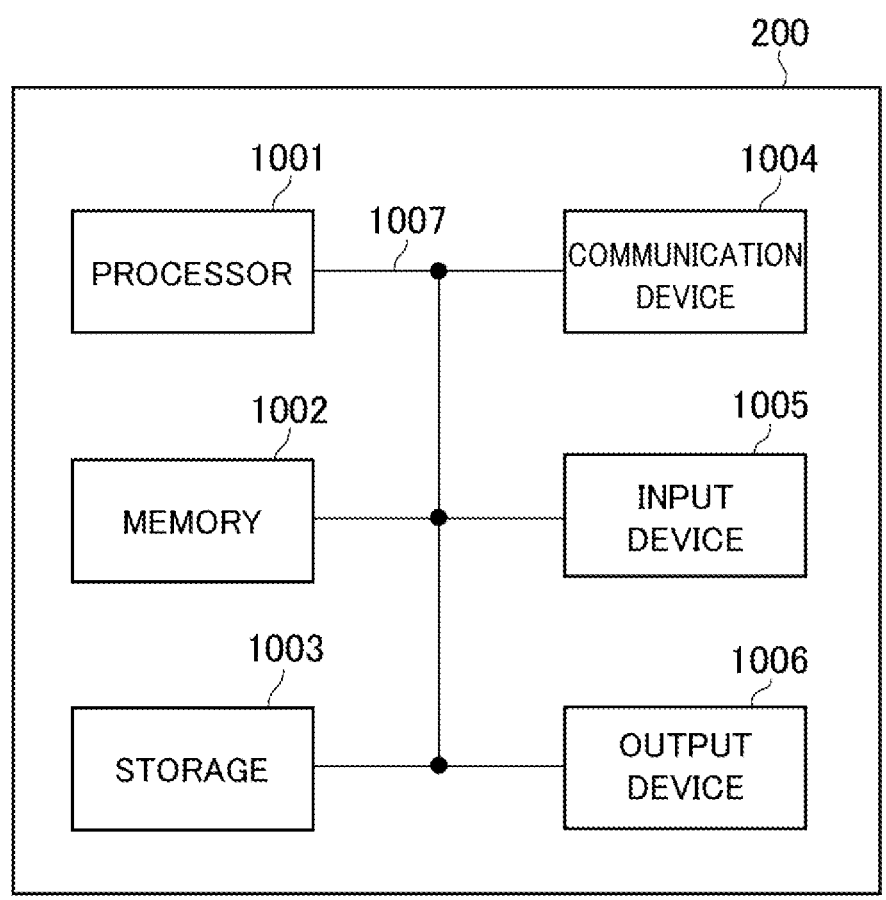
FIG. 14 is a diagram showing an example of a hardware configuration of UE 200.

Furthermore, the UE 200 described above may function as a computer that performs the processing of the radio communication method of the present disclosure. FIG. 14 is a diagram illustrating an example of the hardware configuration of the UE 200. As illustrated in FIG. 14, the UE 200 may be configured as a computer device including a processor 1001, a memory 1002, a storage 1003, a communication device 1004, an input device 1005, an output device 1006, a bus 1007, and the like.

Furthermore, in the following explanation, the term "device" can be substituted with circuit, device, unit, or the like. The hardware configuration of the device may include one or plurality of the devices shown in the figure or may not include some of the devices.

Each of the functional blocks of the UE 200 (see FIG. 4) is implemented by means of any of hardware elements of the computer device or a combination of the hardware elements.

In addition, each function in the UE 200 is realized by loading predetermined software (programs) on hardware such as the processor 1001 and the memory 1002 so that the processor 1001 performs arithmetic operations to control communication via the communication device 1004 and to control at least one of reading and writing of data on the memory 1002 and the storage 1003.

The processor 1001 operates, for example, an operating system to control the entire computer. The processor 1001 may be configured with a Central Processing Unit (CPU) including interfaces with peripheral devices, control devices, arithmetic devices, registers, and the like.

Moreover, the processor 1001 reads a program (program code), a software module, data, and the like from at least one of the storage 1003 and the communication device 1004 into the memory 1002, and executes various processes according to these. As the program, a program causing the computer to execute at least part of the operation described in the above embodiment is used. Alternatively, various processes described above can be executed by one processor 1001 or can be executed simultaneously or sequentially by two or more processors 1001. The processor 1001 can be implemented by using one or more chips. Alternatively, the program may be transmitted from a network via a telecommunication line.

The memory 1002 is a computer readable recording medium and may be configured, for example, with at least one of a Read Only Memory (ROM), Erasable Programmable ROM (EPROM), Electrically Erasable Programmable ROM (EEPROM), Random Access Memory (RAM), and the like. The memory 1002 may be referred to as a register, cache, main memory (main storage device), and the like. The memory 1002 may store therein programs (program codes), software modules, and the like that can execute the method according to one embodiment of the present disclosure.

The storage 1003 is a computer readable recording medium. Examples of the storage 1003 include at least one of an optical disk such as Compact Disc ROM (CD-ROM), a hard disk drive, a flexible disk, a magneto-optical disk (for example, a compact disk, a digital versatile disk, Blu-ray (registered trademark) disk), a smart card, a flash memory (for example, a card, a stick, a key drive), a floppy (registered trademark) disk, a magnetic strip, and the like. The storage 1003 can be referred to as an auxiliary storage device. The recording medium can be, for example, a database including at least one of the memory 1002 and the storage 1003, a server, or other appropriate medium.

The communication device 1004 is hardware (transmission/reception device) capable of performing communication between computers via at least one of a wired network and a wireless network. The communication device 1004 is also referred to as, for example, a network device, a network controller, a network card, a communication module, and the like.

The communication device 1004 may include a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may have an integrated configuration (for example, a touch screen).

Also, the respective devices such as the processor 1001 and the memory 1002 are connected to each other with the bus 1007 for communicating information. The bus 1007 may be constituted by a single bus or may be constituted by different buses for each device-to-device.

Further, the device may be configured to include hardware such as a microprocessor, a Digital Signal Processor (DSP), an Application Specific Integrated Circuit (ASIC), a Programmable Logic Device (PLD), and a Field Programmable Gate Array (FPGA). Some or all of these functional blocks may be realized by means of this hardware. For example, the processor 1001 may be implemented by using at least one of the above-described items of hardware.

Further, notification of information is not limited to that in the aspect/embodiment described in the present disclosure, and may be performed by using other methods. For example, notification of information may be performed by physical layer signaling (for example, Downlink Control Information (DCI), Uplink Control Information (UCI), higher layer signaling (for example, RRC signaling), Medium Access Control (MAC) signaling, broadcast information (Master Information Block (MIB), System Information Block (SIB)), other signals, or a combination thereof. The RRC signaling may also be referred to as an RRC message, for example, or may be an RRC connection setup message, an RRC connection reconfiguration message, or the like.

Each aspect/embodiment described in the present disclosure can be applied to at least one of Long Term Evolution (LTE), LTE-Advanced (LTE-A), SUPER 3G, IMT-Advanced, the 4th generation mobile communication system (4G), the 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), a system using any other appropriate system, and a next-generation system that is expanded based on these. Further, a plurality of systems may be combined (for example, a combination of at least one of LTE and LTE-A with 5G) and applied.

The order of the processing procedures, sequences, flowcharts, and the like of each aspect/embodiment described in the present disclosure may be exchanged as long as there is no contradiction. For example, the methods described in the present disclosure present the elements of the various steps using an exemplary order and are not limited to the presented specific order.

The specific operation that is performed by a base station in the present disclosure may be performed by its upper node in some cases. In a network constituted by one or more network nodes having a base station, it is obvious that the various operations performed for communication with the terminal may be performed by at least one of the base station and other network nodes other than the base station (for example, an MME, an S-GW, and the like may be considered, but there is not limited thereto). In the above, an example in which there is one network node other than the base station is explained; however, a combination of a plurality of other network nodes (for example, an MME and an S-GW) may be used.

Information and signals (information and the like) can be output from a higher layer (or lower layer) to a lower layer (or higher layer). These may be input and output via a plurality of network nodes.

The input/output information can be stored in a specific location (for example, a memory) or can be managed in a management table. The information to be input/output can be overwritten, updated, or added to. The information can be deleted after outputting. The inputted information can be transmitted to another device.

The determination may be made by using a value (0 or 1) represented by one bit, by truth-value (Boolean: true or false), or by comparison of numerical values (for example, comparison with a predetermined value).

Each of the aspects/embodiment described in the present disclosure may be used separately or in combination, or may be switched in accordance with the execution. In addition, notification of predetermined information (for example, notification of "is X") is not limited to being performed explicitly, and it may be performed implicitly (for example, without notifying the predetermined information).

Regardless of being referred to as software, firmware, middleware, microcode, hardware description language, or some other name, software should be interpreted broadly to mean instructions, an instruction set, code, a code segment, program code, a program, a subprogram, a software module, an application, a software application, a software package, a routine, a subroutine, an object, an executable file, an execution thread, a procedure, a function, and the like.

Further, software, instruction, information, and the like may be transmitted and received via a transmission medium. For example, when software is transmitted from a website, a server, or another remote source by using at least one of a wired technology (a coaxial cable, a optical fiber cable, a twisted pair cable, a Digital Subscriber Line (DSL), or the like) and a wireless technology (infrared light, microwave, or the like), then at least one of these wired and wireless technologies is included within the definition of the transmission medium.

Information, signals, or the like described in the present invention may be represented by using any of a variety of different technologies. For example, data, an instruction, a command, information, a signal, a bit, a symbol, a chip, or the like that may be mentioned throughout the above description may be represented by a voltage, a current, an electromagnetic wave, a magnetic field or magnetic particles, an optical field or photons, or a desired combination thereof.

It should be noted that the terms described in the present disclosure and terms necessary for understanding the present disclosure may be replaced with terms having the same or similar meanings. For example, at least one of a channel and a symbol may be a signal (signaling). A signal may also be a message. Further, "Component Carrier (CC)" may be referred to as "carrier frequency", "cell", "frequency carrier", or the like.

The terms "system" and "network" used in the present disclosure can be used interchangeably.

Furthermore, information, parameters, and the like described in the present disclosure can be represented by an absolute value, can be represented by a relative value from a predetermined value, or can be represented by corresponding other information. For example, a radio resource can be indicated using an index.

Names used for the above parameters are not restrictive names in any respect. In addition, formulas and the like using these parameters may be different from those explicitly disclosed in the present disclosure. Since the various channels (for example, a PUCCH, a PDCCH, or the like) and information elements can be identified by any suitable names, the various names allocated to these various channels and information elements shall not be restricted in any way.

In the present disclosure, the terms such as "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. A base station may also be referred to with a term such as a macro cell, a small cell, a femtocell, or a pico-cell.

A base station can accommodate one or more (for example, three) cells (also referred to as sectors). In a configuration in which a base station accommodates a plurality of cells, the entire coverage area of the base station can be divided into a plurality of smaller areas. In each such smaller area, a communication service can be provided by a base station subsystem (for example, a small base station for indoor use (remote radio head: RRH)).

The term "cell" or "sector" refers to a part or all of the coverage area of at least one of a base station and a base station subsystem that performs a communication service in this coverage.

In the present disclosure, the terms such as "mobile station (Mobile Station: MS)", "user terminal", "user equipment (User Equipment: UE)", and "terminal" can be used interchangeably.

A mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms by those skilled in the art.

At least one of a base station and a mobile station may be called a transmitting device, a receiving device, a communication device, or the like. Note that at least one of a base station and a mobile station may be a device mounted on a moving body, a moving body itself, or the like. The moving body may be a vehicle (for example, a car, an airplane, or the like), an unmanned moving body (a drone, a self-driving car, or the like), or a robot (manned type or unmanned type). At least one of a base station and a mobile station also includes a device that does not necessarily move during the communication operation. For example, least one of a base station and a mobile station may be an Internet of Things (IoT) device such as a sensor.

Also, a base station in the present disclosure may be substituted with a mobile station (user terminal, hereinafter the same). For example, each aspect/embodiment of the present disclosure may be applied to a configuration in which communication between a base station and a mobile station is replaced with communication between a plurality of mobile stations (for example, this may be called Device-to-Device (D2D), Vehicle-to-Everything (V2X), or the like). In this case, the mobile station may have the function of a base station. In addition, words such as "uplink" and "downlink" may also be substituted with words corresponding to inter-terminal communication (for example, "side"). For example, an uplink channel, a downlink channel, or the like may be substituted with a side channel.

Similarly, the mobile station in the present disclosure may be substituted with a base station. In this case, the base station may have the function of the mobile station.

The terms "connected", "coupled", or any variations thereof mean any direct or indirect connection or coupling between two or more elements. Also, one or more intermediate elements are present between two elements that are "connected" or "coupled" to each other. The coupling or connection between the elements may be physical, logical, or a combination thereof. For example, "connection" may be substituted with "access". In the present disclosure, two elements can be "connected" or "coupled" to each other by using at least one of one or more wires, one or more cables, and one or more printed electrical connections, and as some non-limiting and non-exhaustive examples, by using electromagnetic energy having wavelengths in the radio frequency domain, a microwave region, and a light (both visible and invisible) region, and the like.

A reference signal may be abbreviated as RS and may be called a pilot according to applicable standards.

As used in the present disclosure, the phrase "based on" does not mean "based only on" unless explicitly stated otherwise. In other words, the phrase "based on" means both "based only on" and "based at least on".

Any reference to an element using a designation such as "first", "second", or the like used in the present disclosure generally does not limit the amount or order of those elements. Such designations can be used in the present disclosure as a convenient method to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive-OR.

Throughout the present disclosure, for example, during translation, if articles such as a, an, and the in English are added, the present disclosure may include that a noun following these articles is used in plural.

In the present disclosure, the wording "A and B are different" may mean "A and B are different from each other". It should be noted that the wording may mean "A and B are each different from C". Terms such as "separate", "couple", or the like may also be interpreted in the same manner as "different".

Although the present disclosure has been described in detail above, it will be obvious to those skilled in the art that the present disclosure is not limited to the embodiments described in the present disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 NG-RAN
100 gNB
200 UE
210 Transmission unit
220 Reception unit
230 Control unit
1001 Processor
1002 Memory
1003 Storage
1004 Communication device
1005 Input device
1006 Output device
1007 Bus
BM Beam
SC Serving cell
NSC Non-serving cell

The invention claimed is:

1. A terminal comprising:
a receiver that receives a plurality of pieces of reference signal setting information for identifying a candidate beam for beam failure recovery;
a processor that assumes that different cell identification information is associated with each of the plurality of pieces of reference signal setting information; and
a transmitter that transmits a recovery request via a physical uplink control channel,
wherein a different physical uplink control channel is associated with each reference signal setting information for beam failure detection.

2. The terminal according to claim 1, wherein in the plurality of pieces of reference signal setting information, a threshold for selecting the candidate beam is set to the same value.

3. A radio communication method comprising:
receiving a plurality of pieces of reference signal setting information for identifying a candidate beam for beam failure recovery;
assuming that different cell identification information is associated with each of the plurality of pieces of reference signal setting information; and
transmitting a recovery request via a physical uplink control channel,
wherein a different physical uplink control channel is associated with each reference signal setting information for beam failure detection.

4. A radio communication system comprising:
a base station; and
a terminal that communicates with the base station, wherein
the base station includes a transmitter that transmits a plurality of pieces of reference signal setting information for identifying a candidate beam for beam failure recovery, and
the terminal includes:
a receiver that receives the plurality of pieces of reference signal setting information,
a processor that assumes that different cell identification information is associated with each of the plurality of pieces of reference signal setting information; and
a transmitter that transmits a recovery request via a physical uplink control channel,
wherein a different physical uplink control channel is associated with each reference signal setting information for beam failure detection.

* * * * *